United States Patent
Watanabe et al.

(10) Patent No.: US 7,311,232 B2
(45) Date of Patent: Dec. 25, 2007

(54) MOTORCYCLE SADDLEBAG MOUNTING DEVICE

(75) Inventors: Kazuyoshi Watanabe, Niiza (JP); Hideo Ochiai, Niiza (JP); Katsumasa Mukai, Wako (JP)

(73) Assignees: Honda Access Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 523 days.

(21) Appl. No.: 10/841,871

(22) Filed: May 6, 2004

(65) Prior Publication Data

US 2004/0232183 A1    Nov. 25, 2004

(30) Foreign Application Priority Data

May 23, 2003    (JP)    ............................. 2003-145889

(51) Int. Cl.
*B62J 9/00*    (2006.01)
(52) U.S. Cl. ....................... 224/413; 224/430
(58) Field of Classification Search ................ 224/413, 224/423, 429, 430, 431, 282, 42.11; *B62J 9/00*
See application file for complete search history.

(56) References Cited

U.S. PATENT DOCUMENTS

| | | | | |
|---|---|---|---|---|
| 2,776,790 A | * | 1/1957 | Zbikowski | ................. 224/443 |
| 4,349,138 A | * | 9/1982 | Bruhn | ........................ 224/443 |
| 4,393,986 A | | 7/1983 | Sirey | |
| 5,558,260 A | * | 9/1996 | Reichert | ..................... 224/413 |
| 6,347,804 B1 | * | 2/2002 | Seibel | ..................... 280/288.4 |

FOREIGN PATENT DOCUMENTS

JP    3-3117    1/1991

* cited by examiner

*Primary Examiner*—Nathan J. Newhouse
*Assistant Examiner*—Corey N Skurdal
(74) *Attorney, Agent, or Firm*—Hamre, Schumann, Mueller & Larson, P.C.

(57) ABSTRACT

A motorcycle saddlebag mounting device having a restricting means for staggering timings of yawing occurring in a motorcycle body and resonance caused by lateral swing of a saddlebag is provided. The restricting means is provided between a support bracket mounted to a seat rail and a saddlebag mounting frame rotatably mounted to the support bracket. Rotation of the frame with respect to the support bracket is restricted, so that resonance caused by yawing of the motorcycle body and lateral swing of the saddlebag is cancelled out.

4 Claims, 10 Drawing Sheets

MOTORCYCLE SADDLEBAG MOUNTING DEVICE

FIELD OF THE INVENTION

The present invention relates to a motorcycle saddlebag mounting device for mounting a saddlebag to a motorcycle body.

BACKGROUND OF THE INVENTION

As this kind of saddlebag mounting device, a motorcycle saddlebag mounting device disclosed, for example, in Japanese Utility Model Laid-Open Publication No. HEI-3-3117 is known. This conventional saddlebag mounting device will be described with reference to FIG. 11.

Referring to FIG. 11, a saddlebag mounting device 100 has a step holder 102 and a side grip 103 mounted to a body frame 101. A support stay 104 is mounted between the step holder 102 and the side grip 103. A support shaft 105 inclined with respect to a vertical direction of the body is rotatably provided between the step holder 102 and the support stay 104, mounted swingably about a pin 105a with respect to the support stay 104. A frame 106 to which a saddlebag 108 is mounted is fixed at both its ends to the shaft 105. An elastic member 107 is interposed between the support stay 104 and the frame 106. The elastic member 107 damps rotation of the frame 106 accompanying rotation of the support shaft 105.

Mounting the saddlebag 108 to the body and putting a heavy load in the saddlebag 108 increases oscillations of the motorcycle body in high-speed driving. One of the motorcycle body oscillations is a yawing resonance frequency.

Further, since the support stay 104 is supported between the step holder 102 and the side grip 103 in the above-described structure, variations in mounting dimensions of the support stay 104 are likely to occur.

It is thus desired to be able to mount the support stay 104 or the like to the motorcycle body with high precision and to reduce the occurrence of yawing.

SUMMARY OF THE INVENTION

According to the present invention, there is provided a motorcycle saddlebag mounting device for mounting a saddlebag to a seat rail extending rearward from a rear end of a main frame, which device comprises: a support bracket mounted to the seat rail along an outside surface of the seat rail; a support shaft mounted to the support bracket; a saddlebag mounting frame rotatably mounted at one side thereof to the support shaft; and a restricting means for restricting rotation of the frame about the support shaft.

The restricting means has the function of staggering timing in which yawing occurs in the motorcycle body and timing in which lateral swing resonance of the saddlebag occurs. The provision of the restricting means for restricting rotation of the frame with respect to the support shaft of the support bracket thus allows resonance due to yawing of the motorcycle body and lateral swing of the saddlebag to be cancelled out.

Since the support bracket is mounted along the outside surface of the seat rail, the yawing resonance frequency of the main frame can be varied through the seat rail. Further, the yawing resonance frequency of the seat rail can be directly varied. As a result, the occurrence of yawing can be reduced. That is, with the mounting portion of the swingable saddlebag to the motorcycle body positioned sidewardly of the seat rail via the support bracket, a yaw moment to be generated by swinging movement of the saddlebag at the seat rail, a source of its generation, can be significantly reduced or dampened.

In a preferred form, the support shaft is provided at a longitudinally substantially middle portion of the seat rail in such a manner as to intersect the seat rail in a side view. At the middle portion of the seat rail, moment in a yaw direction is likely to occur in high-speed driving. Therefore, the center of swing of the saddlebag is positioned at the middle portion so as to disperse a yawing moment, efficiently damping yawing, and stabilizing the motorcycle body.

Preferably, the restricting means is provided between the support bracket and the frame, including elastic members for damping swing of the frame about the support shaft. As a result, movement of the frame can be softened and yawing of the main frame or the seat rail can be converged.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
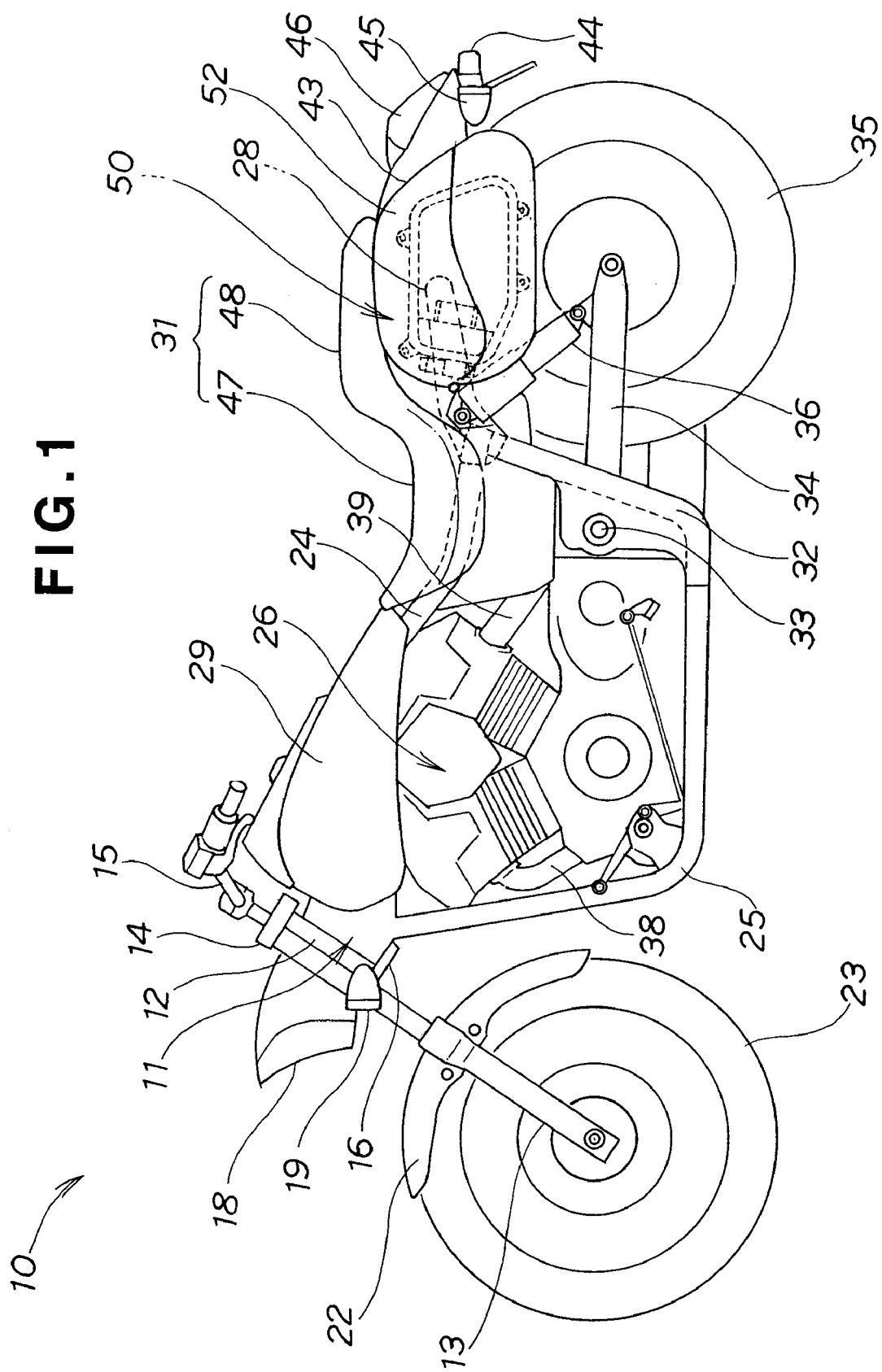
FIG. 1 is a side view of a motorcycle equipped with a saddlebag mounting device according to the present invention.
Figure 2:
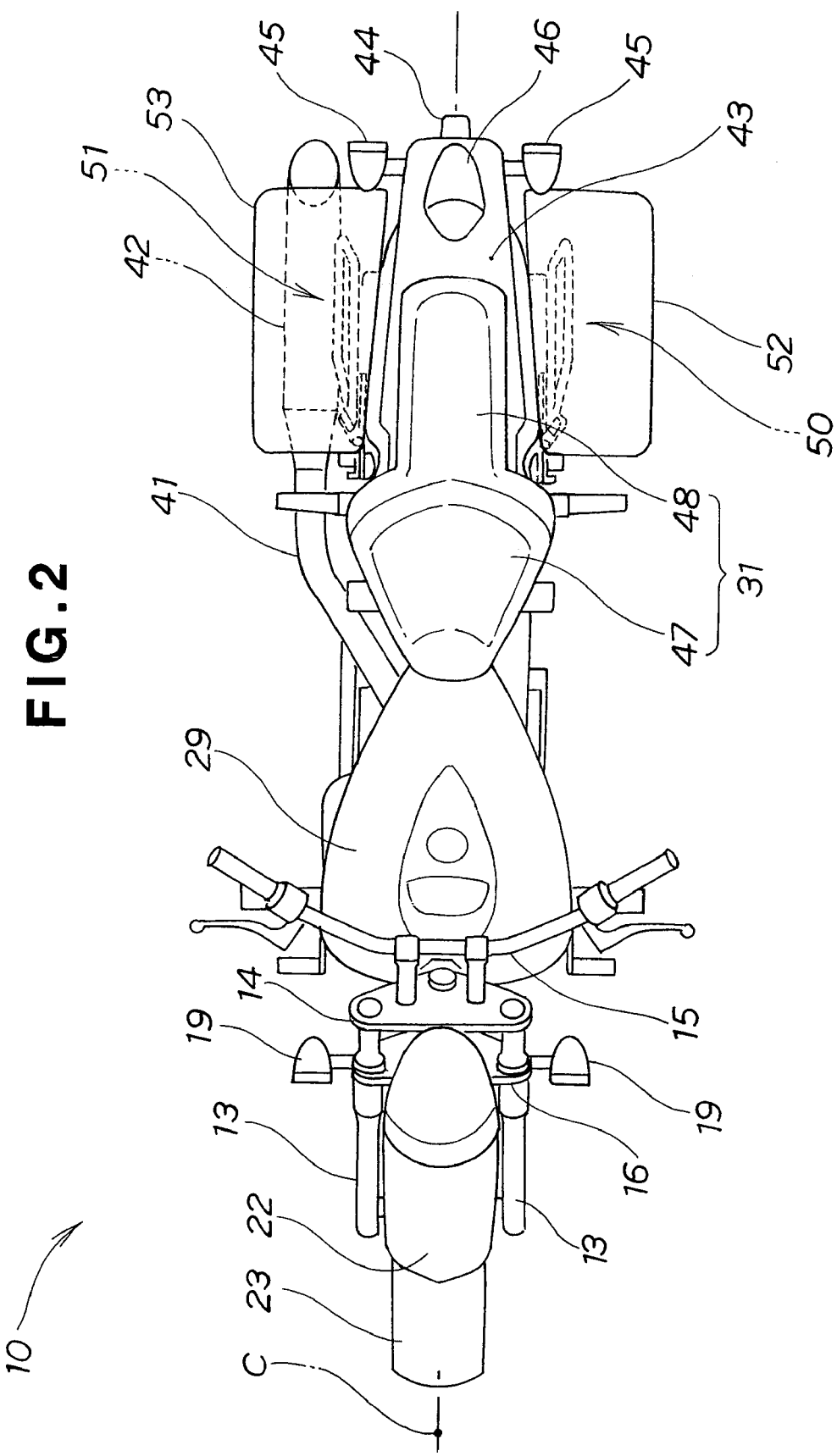
FIG. 2 is a plan view of the motorcycle shown in FIG. 1.

Referring to FIGS. 1 and 2, a motorcycle 10 has a body frame 11. A head tube 12 is provided at the front of the body frame 11. Left and right front fork parts 13, 13 are mounted to the head tube 12 in a steerable manner. A steering handle 15 is mounted on a top bridge 14 of the front fork parts 13, 13. A headlight 18 and left and right front winkers 19, 19 are positioned forward of and between the top bridge 14 and a bottom bridge 16. A front fender 22 and a front wheel 23 are mounted to a lower portion of the front fork 13.

A main frame 24 extends rearward from the front end of the body frame 11. A down tube 25 extends downward from the front end of the body frame 11 and also extends horizontally rearward of the motorcycle body. An engine 26 is disposed between the main frame 24 and the down tube 25. A fuel tank 29 is provided on the main frame 24.

A seat rail 28 extends rearwardly from the rear end of the main frame 24 and the rear end of a subframe 32 to be discussed below. A seat (tandem seat) 31 is mounted onto the seat rail 28.

The subframe part 32 is interposed between the rear end of the down tube 25 and the front end of the seat rail 28. The front end of the seat rail 28 connected to the rear end of the subframe 32 by, e.g., welding. A rear swing arm 34 is mounted at its front end on a pivot 33 provided at a vertically substantially middle portion of the subframe part 32, and extends at its rear end rearward. A rear wheel 35 is rotatably mounted to the rear end of the rear swing arm 34. A rear cushion 36 is provided between a rear portion of the rear swing arm 34 and the body frame 11. Reference numerals 38, 39 denote exhaust pipes extending from the engine 26.

The two exhaust pipes 38, 39 are connected to a collecting pipe 41 as shown in FIG. 2. A muffler 42 is connected to the distal end of the collecting pipe 41. In the figure, reference numeral 43 denotes a rear fender, 44 a license lamp, 45, 45 rear winkers, and 46 a taillight.

The tandem seat 31 includes a driver's seat 47 to be occupied by a driver and a passenger's seat 48 to be occupied by a passenger. The passenger's seat 48 is positioned rearward of the driver's seat 47 and higher than the driver's seat 47.

The motorcycle 10 has left and right saddlebag mounting devices 50, 51 according to the present invention for mounting left and right saddlebags 52, 53 to the rear opposite sides thereof.

The left and right saddlebag mounting devices 50, 51 are positioned symmetrically with respect to the centerline C of the motorcycle body. The left and right saddlebag devices 50, 51 have the same configuration and the left and right saddlebags 52, 53 also have the same configuration. Hereinafter, description will thus be made on the left saddlebag device 50 and the left saddlebag 52, and no description will be made on the right saddlebag device 51 and the right saddlebag 53.

Figure 3:
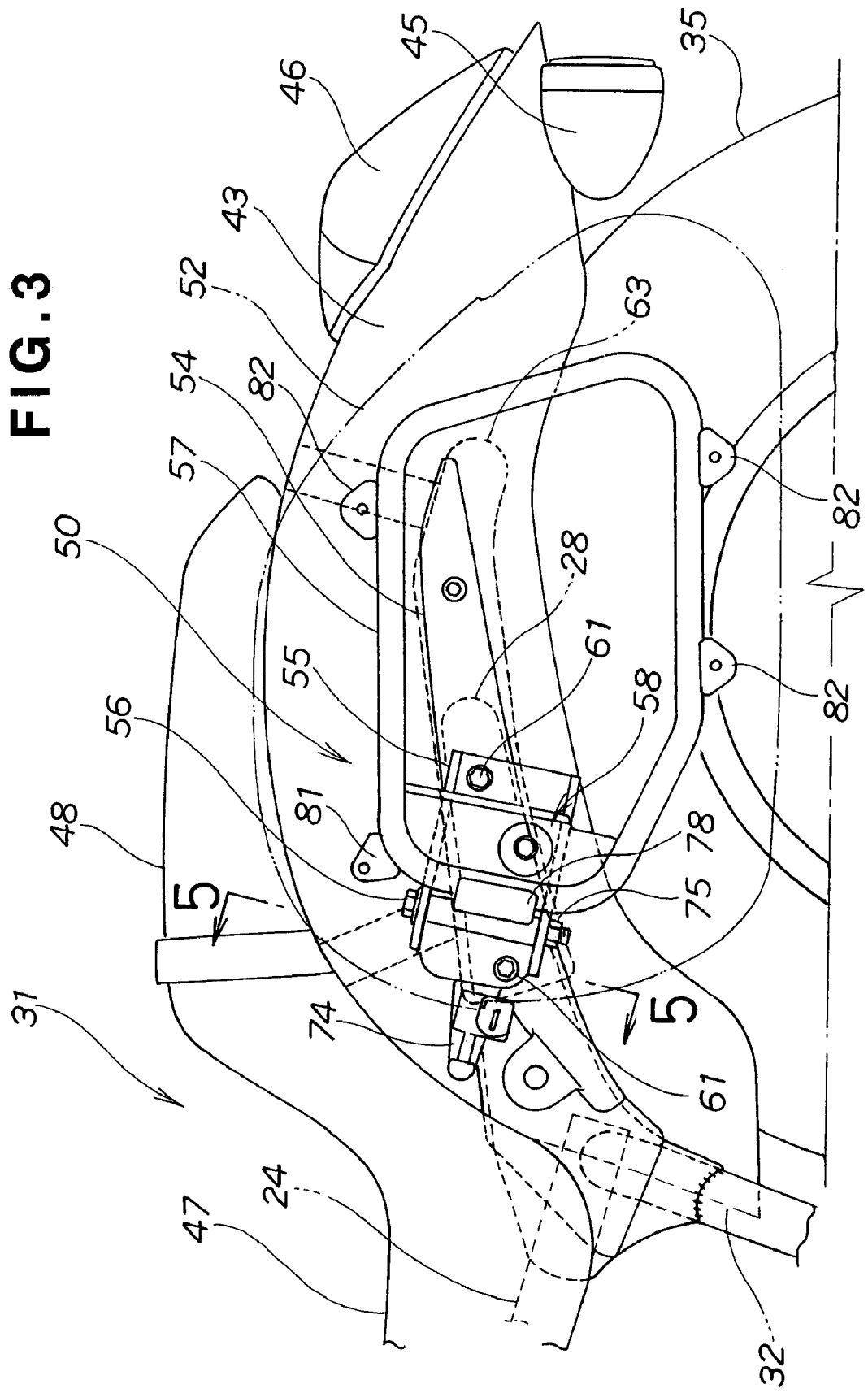
FIG. 3 is a side view of the saddlebag mounting device according to the invention.
Figure 4:
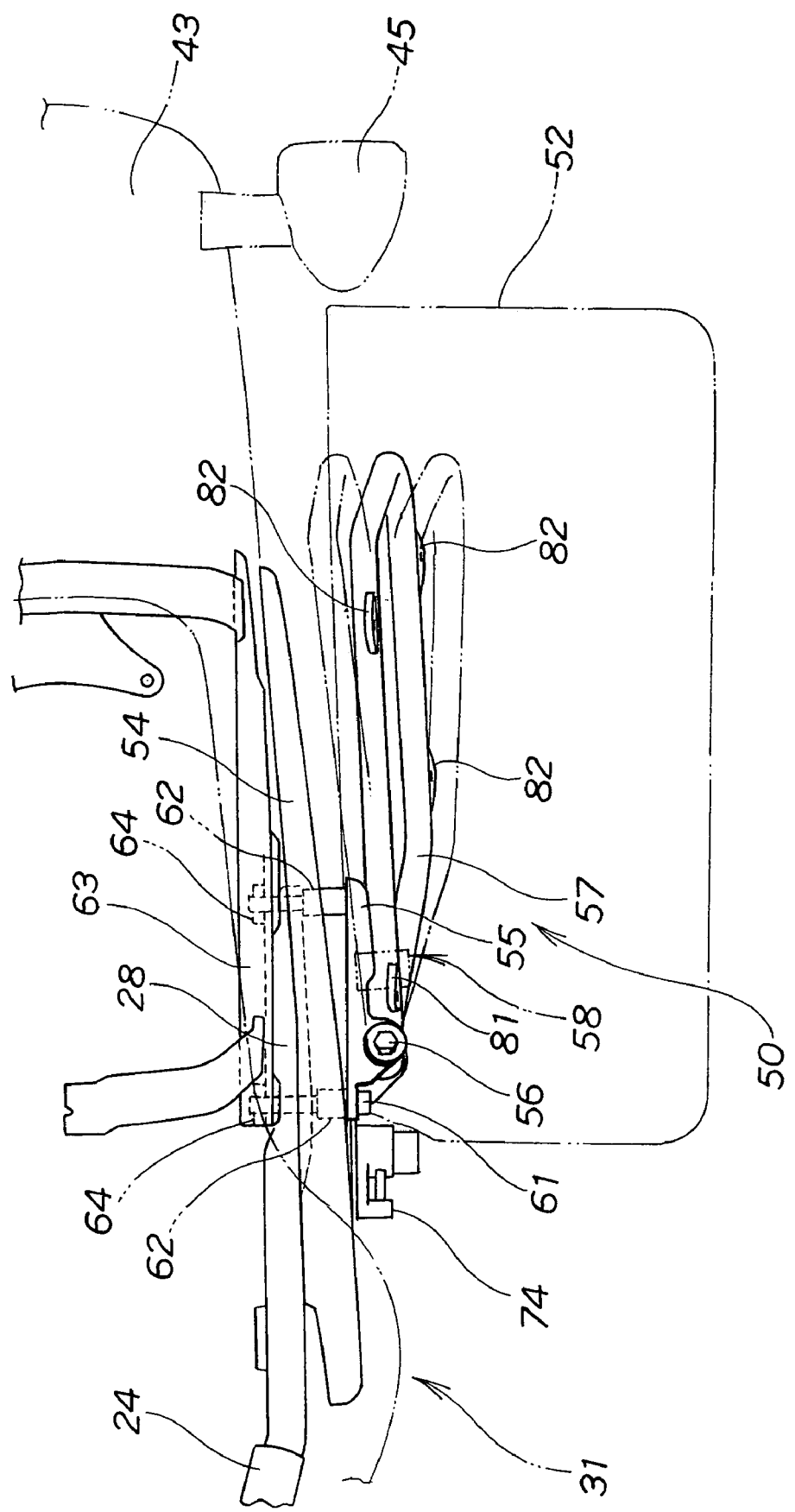
FIG. 4 is a top view of the saddlebag mounting device shown in FIG. 3.

As shown in FIGS. 3 and 4, the left saddlebag mounting device (hereinafter only referred to as a saddlebag device) 50 has a support bracket 55 for rotatably supporting a frame 57, a support shaft 56 provided at the support bracket 55, rotatably supporting the frame 57, the frame 57 to which the saddlebag 52 is mounted, and a restricting means 58 for restricting rotation of the frame 57 with respect to the support bracket 55.

The support bracket 55 is mounted to an outside surface of the seat rail 28 extending rearward from the rear end of the main frame 24.

The support shaft 56 is a bolt mounted to the bracket 55 in such a manner as to be located at a substantially middle portion of the seat rail 28 and intersect the seat rail 28 in a side view. Reference numeral 75 denotes a nut for the support shaft 56.

Figure 5:
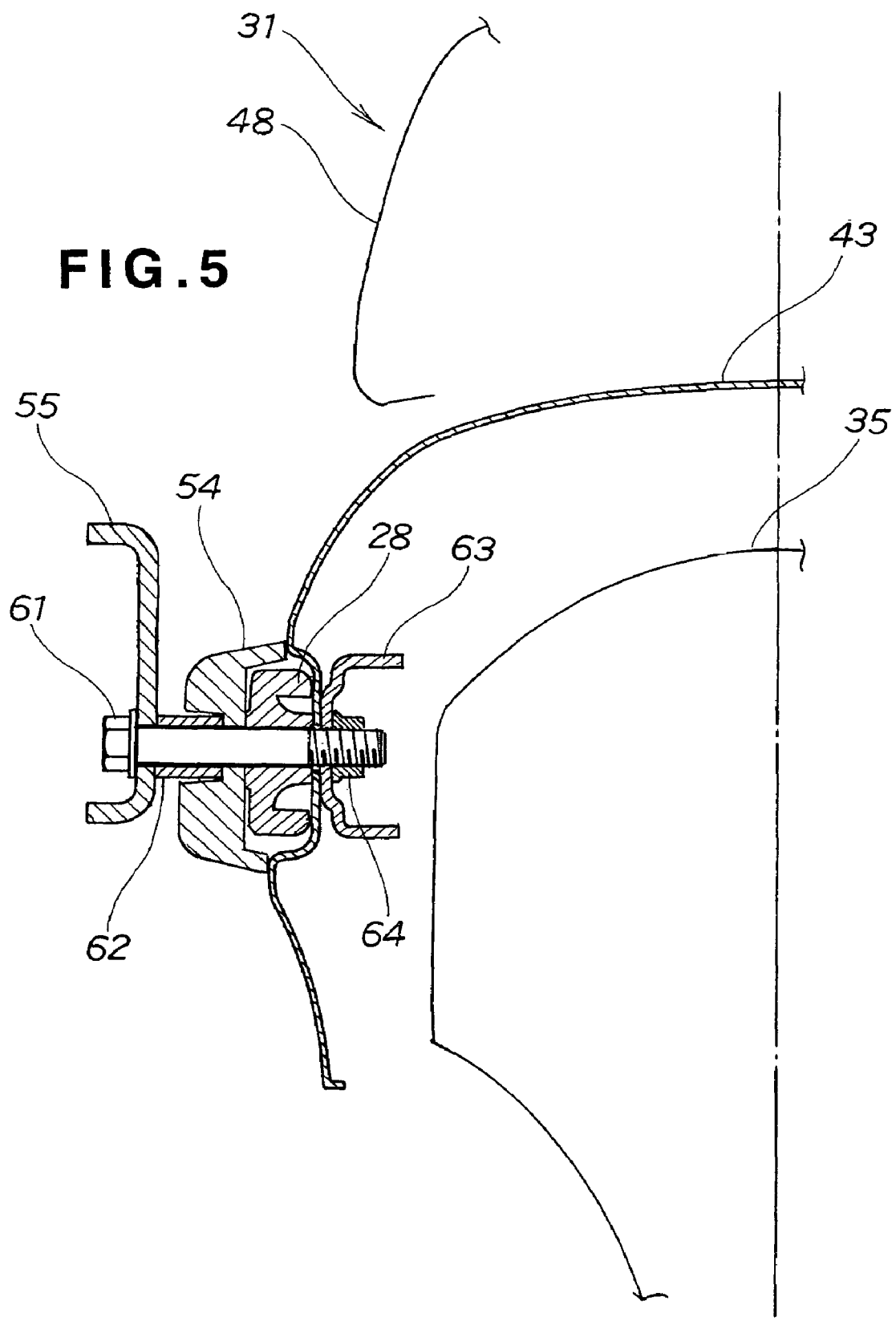
FIG. 5 is a cross-sectional view taken along line 5-5 in FIG. 3.

As shown in FIG. 5, the support bracket 55 is mounted with a bolt 61 to the seat rail 28 located on an outside surface of the rear fender 43 via a spacer 62 and a grab rail 54. The rear fender 43 is mounted with the bolt 61 to the seat rail 28 with a fender bracket 63 located inside the rear fender 43. That is, the bracket 55, spacer 62 and grab rail 54 located outside the rear fender 43, and the rear fender 43 and the fender bracket 63 located inside thereof are fastened together to the seat rail 28 with the bolt 61 and a nut 64.

Figure 6:
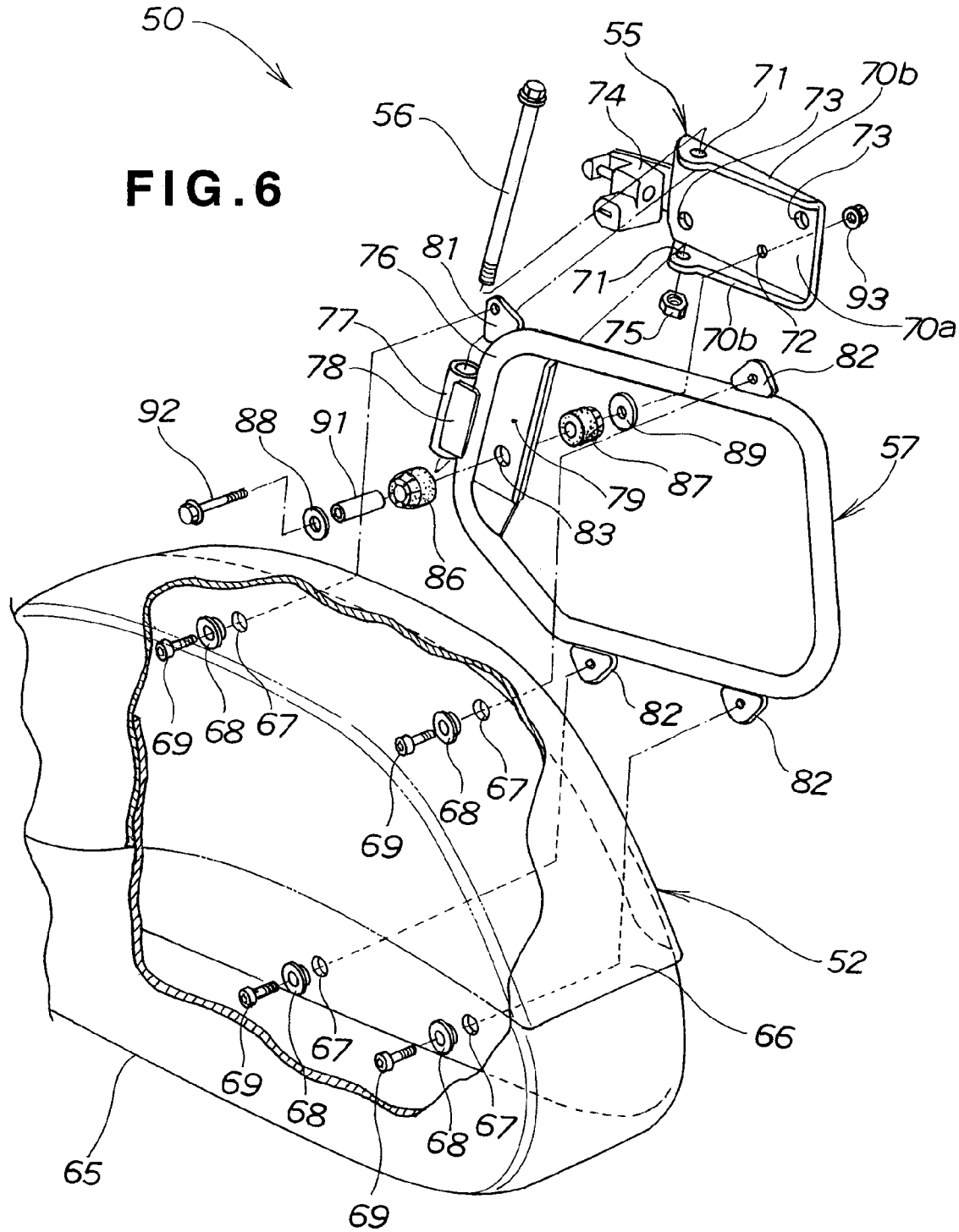
FIG. 6 is an exploded perspective view of the saddlebag mounting device according to the invention.

As shown in FIG. 6, the saddlebag 52 consists of a bag body 65 to hold hand luggage and a lid 66 attached to the bag body 65 in an openable and closable manner.

The bag body 65 has a plurality of mounting holes 67 (four in the illustrated example), and is fixed to the frame 57 with mounting screws 69 via collars 68 inserted into the mounting holes 67.

The support bracket 55 consists of a base plate 70a and side walls 70b, 70b integrally provided at the opposite sides thereof, having a channel section shape.

The side walls 70b, 70b are formed with shaft insertion holes 71, 71, respectively, through which the support shaft 56 of a bolt is inserted. The base plate 70a has a mounting hole 72 for mounting components of the restricting means 58 shown in FIG. 6, and two through holes 73, 73 through which the bolts 61, 61 shown in FIG. 4 extend.

The support bracket 55 is mounted with a hanger 74 on which a helmet not shown is hung.

Figure 7:
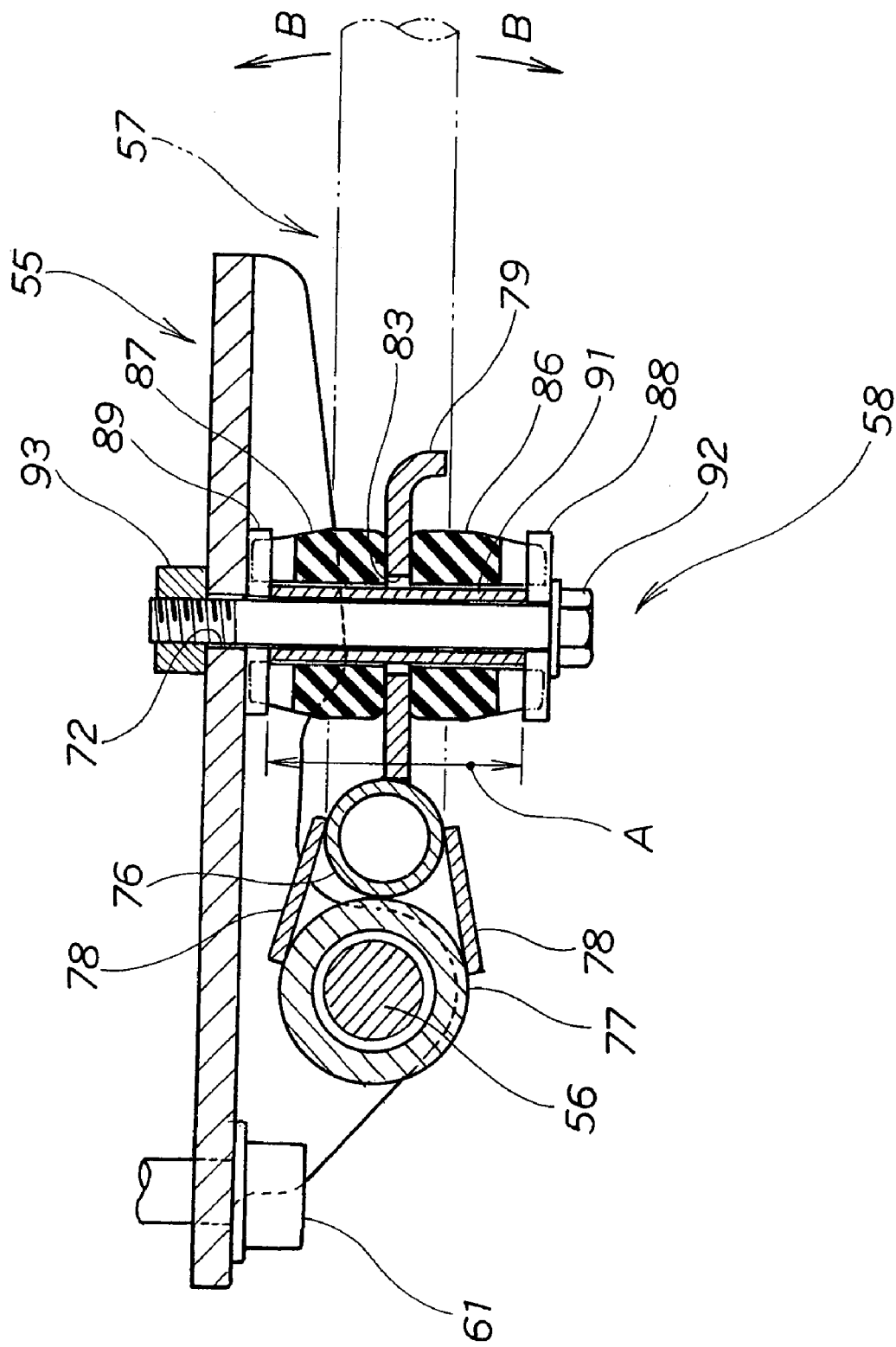
FIG. 7 is a cross-sectional view of a restricting means interposed between a support bracket and a frame.

The frame 57 has a pipe section frame 76, a connecting pipe or sleeve 77 attached to the frame 76 to allow insertion of the support shaft 56 therethrough in such a manner as to be rotatable with respect to the support shaft 56, two reinforcing plates 78, 78 for reinforcing the mounting of the sleeve 77 to the pipe frame 76, a mounting plate 79 mounted in such a manner as to protrude toward a closed plane of the pipe frame 76 for mounting the restricting means 58 shown in FIG. 7 thereto, and mounting portions 81, 82 provided around the periphery of the pipe frame 76 for mounting the saddlebag 52 thereto.

The mounting plate 79 has a restricting means mounting hole 83 formed for mounting the restricting means 58 thereto.

Since mounting portions of the swingable saddlebag 52 to the motorcycle body are thus concentrated on the outside surface of the seat rail 28, a yaw moment generated from the seat rail 28 by swing motion of the saddlebag 52 can be effectively reduced from a source of its generation.

The frame 57 to which the saddlebag 52 is mounted is mounted to the bracket 55 via the support shaft 56, and the restricting means 58 is also mounted to the bracket 55. When mounting the saddlebag mounting device 50 to the motorcycle body, it is only required to mount the bracket 55 to the seat rail 28 of the body, resulting in facilitated mounting and increased precision in mounting the saddlebag mounting device 50 to the motorcycle body.

Figure 11:
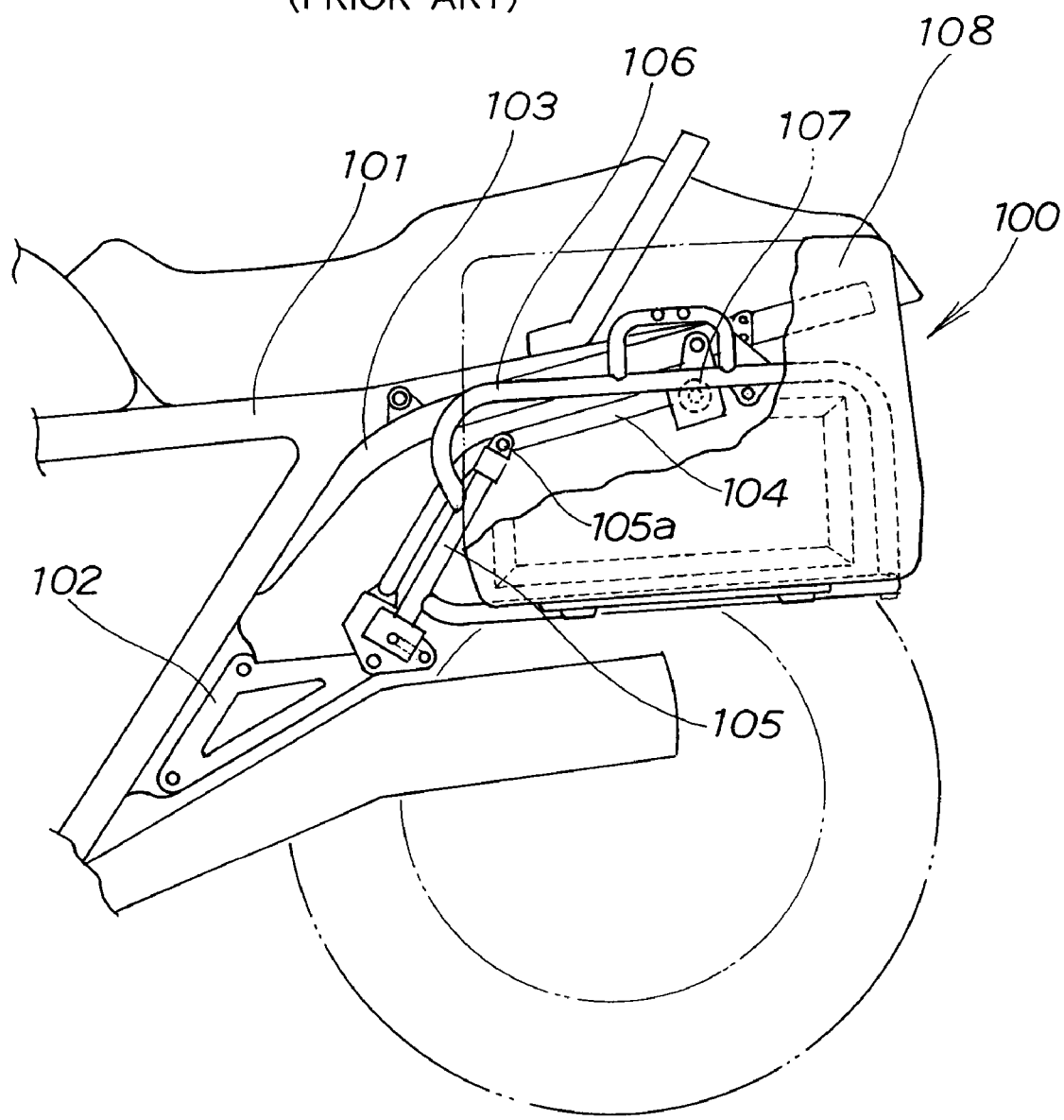
FIG. 11 is a side view of a conventional saddlebag mounting device.

In the conventional saddlebag mounting device shown in FIG. 11, for example, in which the support shaft 105 is arranged at an inclination with respect to a vertical line, the saddlebag 108 also moves in a vertical direction when the frame 106 to which the saddlebag 108 is mounted swings with the support shaft 105.

In this embodiment, the support shaft 56 is slightly inclined to be in as nearly a vertical position as possible, thereby to minimize the vertical movement of the saddlebag 52 accordingly. As a result, vibration of luggage held in the saddlebag 52 is minimized to reduce a pitching motion of the motorcycle body. Further, rolling, a rotary motion of the motorcycle body about the center of gravity, is also minimized.

The restricting means 58 includes, as shown in FIG. 7, a first elastic member 86 disposed outside the mounting plate 79, a second elastic member 87 disposed inside the mounting plate 79, washers 88, 89 put on the first and second elastic members 86, 87, respectively, a collar 91 extending through the mounting plate 79 and the first and second elastic members 86, 87, a bolt 92 extending through the collar 91, the washers 88, 89 and the support bracket 55, and a nut 93 screwed onto the bolt 92.

The first and second elastic members 86, 87 are the same, and the washers 88, 89 are also the same.

The collar 91 is a distance limiting member for producing a predetermined initial deformation in the first and second elastic members 86, 87. Specifically, the collar 91 is a member for ensuring a predetermined dimension A of the first and second elastic members 86, 87 when the mounting plate 79 is sandwiched between the first and second elastic members 86, 87 and the first and second elastic members 86, 87 and the mounting plate 79 are fastened to the bracket 55 with the bolt 92. Thus, the collar 91 can produce the predetermined initial deformation in the first and second elastic members 86, 87 with high precision.

Consequently, the frame 57 can be swung as shown by arrows B, B, and also the swing of the frame 57 can be damped.

Figure 8:
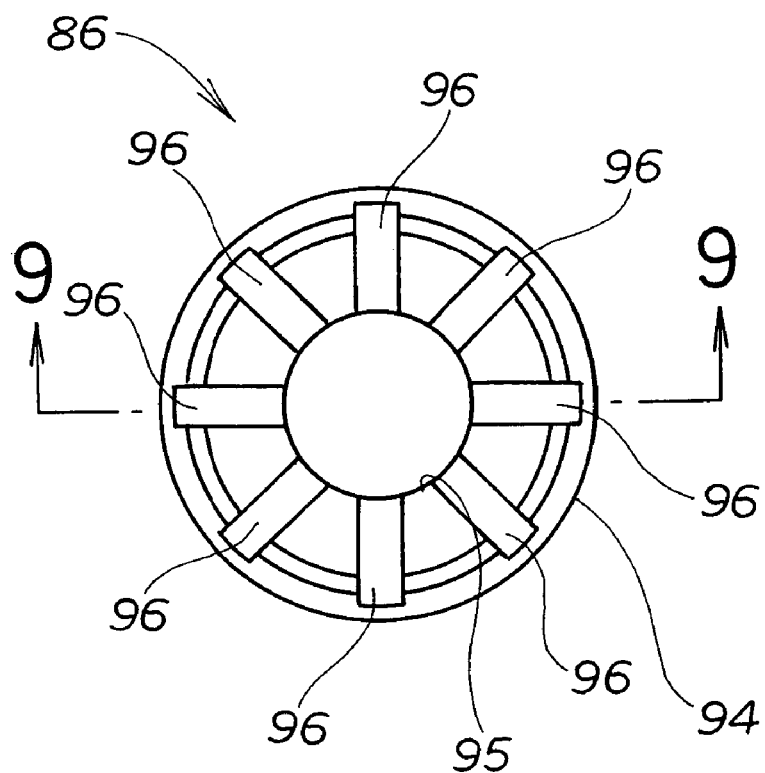
FIG. 8 is a plan view of a first elastic member shown in FIG. 7.
Figure 9:
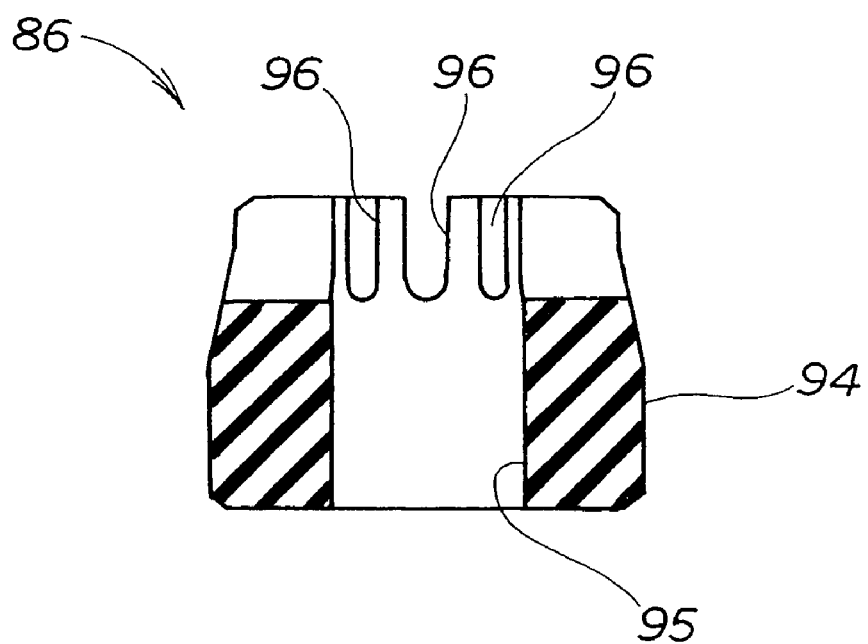
FIG. 9 is a cross-sectional view taken along line 9-9 in FIG. 8.

FIGS. 8 and 9 illustrate the first elastic member 86 of the restricting means 58 shown in FIG. 7.

The first elastic member 86 consists of a body 94, a collar through hole 95 formed in the center of the body 94, and a plurality of slits 96 formed in one end of the body 94 for previously causing the predetermined initial deformation.

The provision of the slits 96 in the first elastic member 86 can facilitate the production of the predetermined initial deformation.

Now, the function of the saddlebag mounting device 50 will be described with reference to FIGS. 10A to 10C.

Figure 10A:
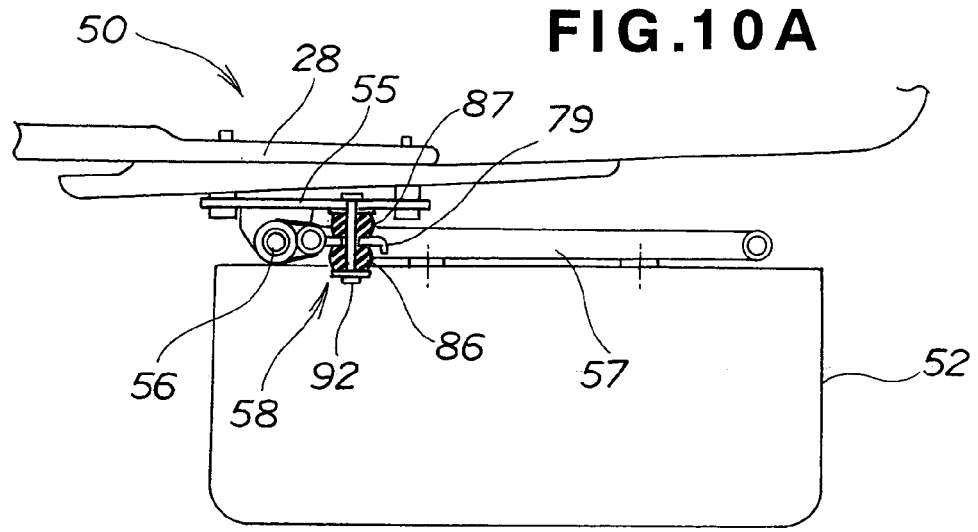
FIGS. 10A to 10C are diagrams illustrating the damping of rotation of a saddlebag by the restricting means.

FIG. 10A illustrates the saddlebag mounting device 50 and the saddlebag 52 when the motorcycle 10 shown in FIG. 2 is going straight. At that time, the first and second elastic members 86, 87 maintain the predetermined initial deformation.

Figure 10B:
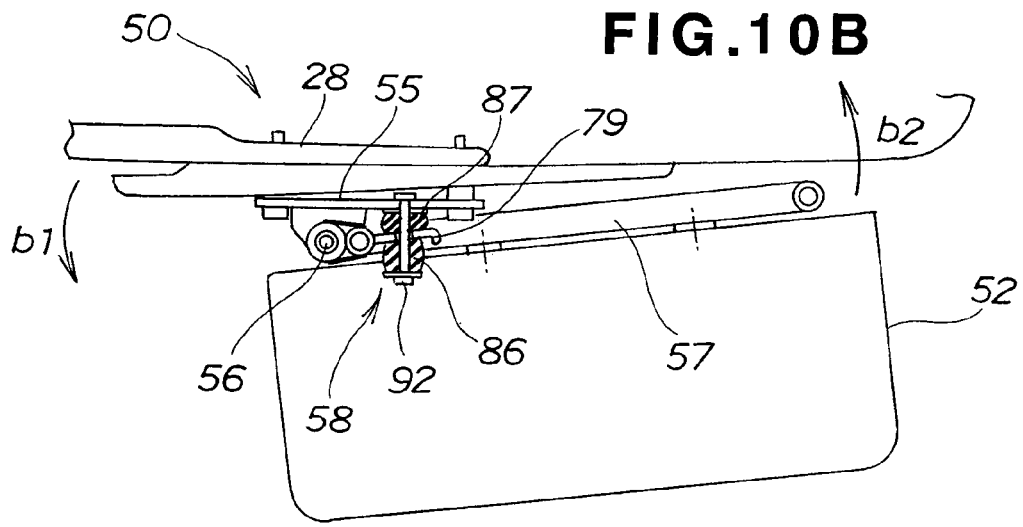

FIG. 10B illustrates the saddlebag mounting device 50 and the saddlebag 52 when the motorcycle 10 is turned left. When the motorcycle 10 is turned left as shown by arrow b1, the frame 57 tilts toward the center of the body as shown by arrow b2 about the support shaft 56. At that time, the first elastic member 86 expands and the second elastic member 87 receives a force in a compression direction.

Figure 10C:
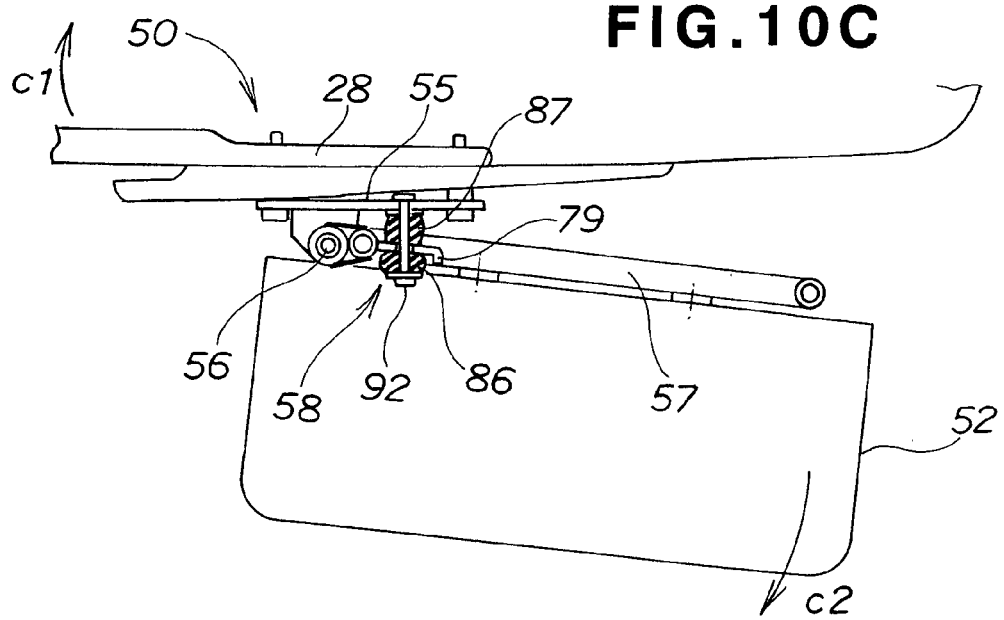

FIG. 10C illustrates the saddlebag mounting device 50 and the saddlebag 52 when the motorcycle 10 is turned right. When the motorcycle 10 is turned right as shown by arrow c1, the frame 57 tilts toward the outside of the body as shown by arrow c2 about the support shaft 56. At that time, the second elastic member 87 expands, and the first elastic member 86 receives a force in a compression direction.

In summary, the restricting means 58 has the first and second elastic members 86, 87 interposed between the frame 57 and the support bracket 55 so as to damp the swing of the frame 57 about the support shaft 56. Therefore, the swing motion of the frame 57 is reduced. As a result, yawing of the main frame 24 (see FIG. 3) or the seat rail 28 can be converged.

The embodiment has been illustrated with the example of forming the slits 96 in the elastic member 86 as shown in FIG. 9, but is not limited thereto. Alternatively, an elastic member of a substantially cylindrical member without slits may be used.

Obviously, various minor changes and modifications of the present invention are possible in the light of the above teaching. It is therefore to be understood that within the scope of the appended claims the invention may be practiced otherwise than as specifically described.

What is claimed is:

1. A motorcycle saddlebag mounting device for mounting a saddlebag to a rear end of a motorcycle body frame, the device comprising:
   a seat;
   a seat rail extending from the rear end of the motorcycle body frame, said seat being mounted onto said seat rail;
   a support bracket mounted to the seat rail along an outside surface of the seat rail;
   a support shaft mounted to the support bracket, the support shaft being provided at a longitudinally substantially middle portion of the seat rail in such a manner as to intersect the seat rail in a side view;
   a saddlebag mounting frame rotatably mounted on a front end portion thereof to the support shaft; and
   a restricting means for restricting rotation of the saddlebag mounting frame about the support shaft, the restricting means being provided between the support bracket and the saddlebag mounting frame, including elastic members for damping swing of the saddlebag mounting frame about the support shaft, the restricting means being disposed on the front end portion of the saddlebag mounting frame.

2. A saddlebag mounting device as set forth in claim 1, wherein the elastic members we mounted under biased condition.

3. A saddlebag mounting device as set forth as set forth in claim 1, wherein each of the elastic members has a plurality of slits formed in an end thereof for allowing the elastic member to cause initial elastic deformation when the restricting means is provided between the support bracket and the saddlebag mounting frame.

4. A motorcycle saddlebag mounting device for mounting a saddlebag to a rear end of a motorcycle body frame, the device comprising:
   a seat;
   a scat rail extending from the rear end of the motorcycle body frame, said seat being mounted onto said seat rail;
   a support bracket mounted to the seat rail along an outside surface of the seat rail;
   a support shaft mounted to the support bracket, said support shaft being no more than slightly inclined from a vertical position, thereby making pitching and rolling motion about said support shaft minimal;
   a saddlebag mounting frame having a sleeve, said saddlebag mounting frame rotatably mounted to the support bracket by the support shaft received in the sleeve; and
   restricting means for restricting rotation of the saddlebag mounting frame about the support shaft, said restricting means having a shaft oriented orthogonal to said support shaft, said restricting means restricting movement along said restricting means shaft thereby damping swing of said saddlebag mounting frame about said support shaft and allowing yawing of the motorcycle body frame to converge so that pitching, rolling, and yawing motion of said saddlebag relative to said motorcycle body frame is minimal.

* * * * *